United States Patent

Chertok

[15] 3,662,363

[45] May 9, 1972

[54] MEMORY SYSTEM USING PHONOGRAPH-TYPE DISC

[72] Inventor: Allan B. Chertok, Cambridge, Mass.

[73] Assignee: EG&G, Inc., Bedford, Mass.

[22] Filed: Apr. 17, 1969

[21] Appl. No.: 817,068

[52] U.S. Cl. ..........340/174.1 C, 179/100.2 R, 179/100.4 D, 274/9, 274/42, 340/173

[51] Int. Cl. ....................G11b 3/06, G11b 3/78, G11b 13/02

[58] Field of Search..............179/100.2 T, 100.2 A, 100.3 V, 179/100.4 D; 340/173, 174.1 C; 274/9, 13, 23 A, 41.4, 42

[56] References Cited

UNITED STATES PATENTS

| | | | |
|---|---|---|---|
| 2,396,409 | 3/1946 | Berzer | 179/100.2 S |
| 2,969,525 | 1/1961 | Hill | 340/174.1 C |
| 3,212,075 | 10/1965 | Damerau et al. | 179/100.2 A |
| 3,348,213 | 10/1967 | Evans | 340/174.1 C |
| 3,375,507 | 3/1968 | Gleim et al. | 340/174.1 C |
| 2,547,009 | 4/1951 | Huston et al. | 179/100.4 |
| 2,690,913 | 10/1954 | Rabinow | 340/174.1 |
| 2,811,709 | 10/1957 | Haselton et al. | 340/174.1 |
| 3,511,509 | 5/1970 | Firestone | 274/9 |

*Primary Examiner*—Bernard Konick
*Assistant Examiner*—J. Russell Goudeau
*Attorney*—Ralph L. Cadwallader and Kenway, Jenney & Hildreth

[57] ABSTRACT

A random access memory system for the storage of digital data in which digital signals are inscribed in a spiral groove on a phonograph record with the specific sequence of signals indicative of a radial location bearing a fixed relation to the radial location where each sequence is inscribed. The disk is supported on a rotating turntable and the digital signals are sensed by a stylus carried on an arm which can be positioned at an appropriate radial position on the disk. Address entry signals corresponding to the digital sequences in the groove are entered into the machine and control the positioning of the arm. An output signal is generated when the digital sequence read by the sensing means corresponds to the entered address. Additional digital information may be stored at specific radial positions identified by the digital addresses and this information is read out by a sensing device, only when the machine has found a match between the entered address and the digital sequence identifying the particular radial position.

29 Claims, 13 Drawing Figures

INVENTOR.
ALLAN B. CHERTOK
BY Ralph L. Cadwallader
Kenway, Jenney & Hildreth
ATTORNEYS INVENTOR.
ALLAN B. CHERTOK
BY Ralph L. Cadwallader
Kenway, Jenney & Hildreth
ATTORNEYS INVENTOR.
ALLAN B. CHERTOK
BY
Kenway, Jenney & Hildreth
ATTORNEYS INVENTOR.
ALLAN B. CHERTOK
BY Ralph L. Cadwallader
Kenway, Jenney & Hildreth
ATTORNEYS INVENTOR.
ALLAN B. CHERTOK
BY Ralph L. Cadwallader
Kenway, Jenney & Hildreth
ATTORNEYS

MEMORY SYSTEM USING PHONOGRAPH-TYPE DISC

FIELD OF THE INVENTION

This invention relates in general to random access memory systems and more particularly to a relatively high data density storage system providing moderate access times.

BACKGROUND OF THE INVENTION

A great variety of systems have been evolved for storage of information, particularly digital information, in a medium at known address positions. The particular design configuration for any such system depends upon a number of factors including the cost factor, the size and total bit capacity requirements, the stability and the access time limitations. One approach to long term memory systems has been the construction of matrices of magnetic cores in which a particular address location may be interrogated by selecting leads on each of two coordinates which intersect at the core to be addressed. These systems, while permitting relatively high stability and accuracy, as well as very fast access time, are limited in terms of storage density and a high cost factor. Another design approach has utilized a continuous magnetic surface with the orientation of local areas carrying the information. Such systems, for example, have been used with magnetic tapes and disks having concentric magnetic tracks on one or both surfaces. Again these systems are relatively expensive since they involve very sophisticated addressing systems in order to provide for precise readout of the tracks or for transport of the tape to a known position. One limitation of both of these prior art systems occurs when it is desired to store the same information in a number of memory devices, that is, if it is desired to store a particular information catalog in a large number of memory units.

It is the primary purpose of the present invention to provide a random access memory system having an intermediate speed access time, a high bit density capacity, an economic cost factor and which is capable of readily replicating the stored information in a large number of memory units.

SUMMARY OF THE INVENTION

Broadly speaking, the present invention employs a rotating surface, such as a disk or cylinder, having inscribed thereon a generally spiral groove, with the groove carrying address information indicating, in the case of the disk, the radial location of portions of the groove. In the case of the cylinder, the address information carried in the groove would be indicative of the axial position of that portion of the groove. The memory information may be stored either in the same grooves with the address information or in a different portion of the record with, however, the information stored being in fixed relationship to the portion of the groove carrying its address. A sensor for reading out the information stored in the record is carried on an arm which is guided into sensing position over the information carrying portion of the record by a pin or stylus engaged in and traveling in the spiral groove. The memory system provides for the storage of information such as digital sequences, in a number of separate areas, each area being designated by address.

In operation, when it is desired to ascertain the information stored at a particular address, the arm guide pin is engaged in appropriate position in the groove and travels along the groove. The address information may be stored either as undulations in the groove, as in a normal phonograph record, or may be carried in the form of a surface variation within the groove which can be read out optically or magnetically. In any one of these techniques, the signal would normally be carried as a digital signal and, when an address entry is made to the system, the stylus or address sensing element continues to read out addresses until the stylus reaches the address point being sought. Once this address is reached, the circuitry connected to the information sensor is actuated to read out the stored information.

As will be described in more detail below, there are a number of specific embodiments of this memory system. One such embodiment consists of a disk in which a groove is inscribed in the fashion of a phonograph record with the stored information in the form of digital signals being carried as undulations of the groove. In this embodiment the addressing information may be carried in the same groove as the information, perhaps constituting a portion of the information carrying signal sequence. Alternatively a dual channel system, such as a stereo record, may be used with the addressing information carried in one channel and the stored information in the other. One significant advantage of this type of embodiment is that, once a master recording is made, multiple copies may be easily replicated by the usual record stamping process. Other embodiments, while retaining the groove addressing feature, may carry the stored information in the form of magnetic signals on a magnetizable portion of the disk surface.

The memory system described finds very wide application in applications requiring moderate access speed (for example, a few seconds) and storage capacities up to $10^5$ bits. The groove in the medium provides not only for precise addressing, but also in most instances for guiding the sensing head which receives the information, thereby considerably simplifying the mechanical tolerances required, despite the high density bit capacity of the medium. Because of this characteristic the cost factors of the system are quite low.

PREFERRED EMBODIMENTS

Figure 1:
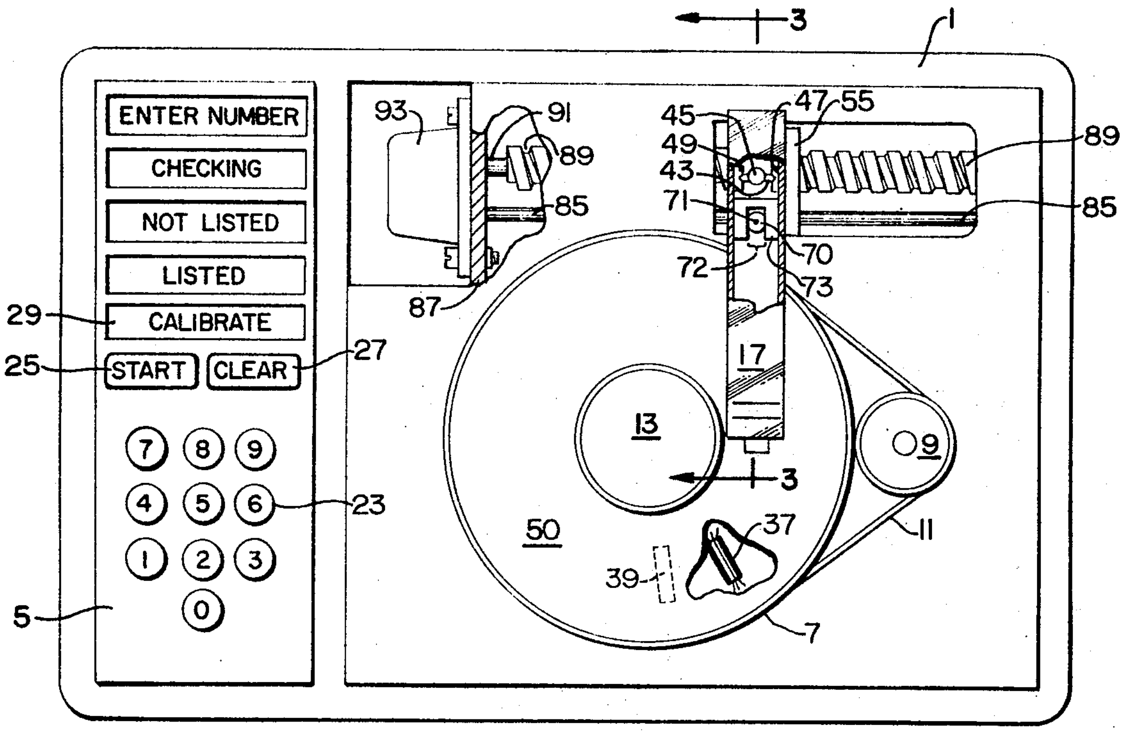
FIG. 1 is an illustration generally in plan view of one embodiment of a memory system constructed in accordance with the principles of this invention.

In FIG. 1, there is illustrated one embodiment of a memory system of this invention. While there are a number of applications for such a memory system, the particular configuration shown is used to store a list of 10 digit decimal numbers and a particular number may be "looked up" to ascertain whether that number is listed.

With reference now to FIG. 1, the memory system includes a base 1 on which is rotatably mounted turntable 7 carrying a central post 13. The turntable 7 is driven by a belt 11 from motor spindle 9. An arm 17 extends over the surface of the turntable and is supported on a worm screw 89 in such a fashion that the rotation of the screw 89 by stepping motor 93 causes the arm 17 to traverse along the screw 89 thereby moving the arm 17 radially inwardly or outwardly across the turntable surface.

The memory system also includes a keyboard section 5 having a series of push buttons and translucent panels, the panels being designated Enter Number, Checking, Not Listed and Listed. The push buttons include a series of digit push buttons zero through nine designated generally 23, a start push button 25, a clear push button 27 and a calibrate push button 29.

Figure 2:
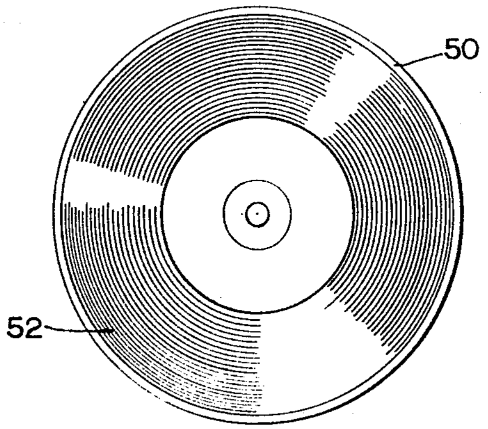
FIG. 2 is an illustration of a storage disk suitable for use in the embodiment of FIG. 1.
Figure 5:
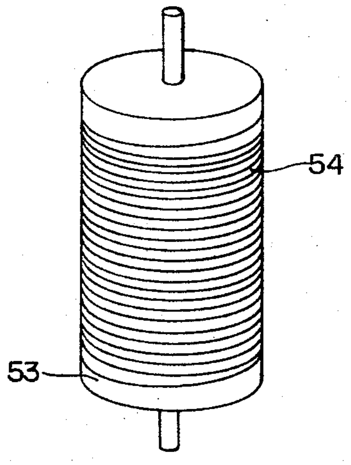
FIG. 5 is an illustration of a storage cylinder for performing the same function as the disk of FIG. 4.

The memory disk to be employed in the system of FIG. 1 is shown in FIG. 2. The disk 50 is formed of a conventional 7 inch 45 r.p.m. phonograph record having inscribed on it a spiral groove 52. The spiral groove 52 would typically have a pitch of 100–500 turns/inch, and a width of 2–5 mils, the entire series of turns extending from an outside diameter of 6-⅝ of an inch to an inside diameter of 3 ½ inches. The list of 10 digit numbers are stored in a predetermined order in the groove in the form of undulations which may be read out in binary form. While a variety of signal formats may be employed to represent the digital data, a particularly suitable format is described in pending application, Ser. No. 788,441 filed Jan. 2, 1969. In the configuration illustrated in FIG. 2, the address information consists of a portion of the binary representation of the listed numbers themselves. Thus the addresses may be formed of the least significant bits of eight of the 10 binary coded decimal (BCD) words representing the digit numbers. At each address location there will be stored all those decimal numbers in which the least significant bit of the final BCD words are identical. At each address the digital numbers are arranged in sequence in order of their decimal digit value with the larger values extending along the groove toward the center of the disk. Each address location corresponds then to a portion of the spiral groove and may include one or more turns of this groove.

In general the operation of the memory system is one wherein the ten digit number to be looked up is entered through the keyboard pushbuttons 23, the address where this number would be located is then determined by electronics associated with the system, the pickup arm 17 is directed to the general location of the address and, when the stylus 21 is located in that portion of the groove containing the proper address, a comparator is actuated to compare the numbers stored in the groove with the number entered through the keyboard.

Figure 4:
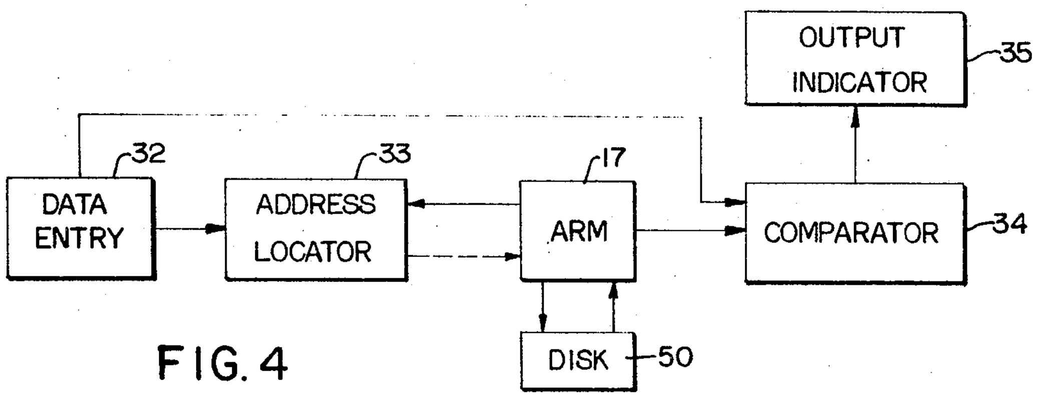
FIG. 4 is an illustration in block diagrammatic form of the memory system of FIG. 1.

In FIG. 4 there is illustrated a general block diagram for the system. The data and address entry unit 32 provides an electrical signal to address locator 33 and also to the comparator unit 34. The address locator 33 provides a mechanical control signal controlling the position of the arm 17 and the arm 17 receives a signal from the disk 50 and provides an output signal to comparator 34. The output of comparator 34 is provided to an output indicator unit 35. As previously indicated the data address entry unit, in this embodiment, is a keyboard, such as illustrated in FIG. 1 and further includes means for encoding the entered decimal digits in binary form and storing the complete ten digit number while the memory system checks whether or not this number is listed. The address locator 33 may take any of several forms, but conveniently may include a shift register which stores only those bits in the binary representation of the ten digit number which represent the address. The locator 33 may include a second shift register which stores the address of the actual position of the arm 17. Thus to go to an entered address the difference in the numbers stored in the register serves as a drive force for a stepping motor. The comparator 34 would also typically include a shift register in which would be stored the binary representation of the entire ten digit decimal number. The comparator is arranged to provide one output signal when the number being read from the memory disk is identical with that keyboarded into the data entry unit 32 and to provide a different output signal when a number from the data disk is larger in magnitude than the number which has been keyboarded into the data entry unit 32. The system is arranged so that no comparison is made until the address at which the arm 17 is located is identical to that of the address of the keyboarded entry.

Figure 3:
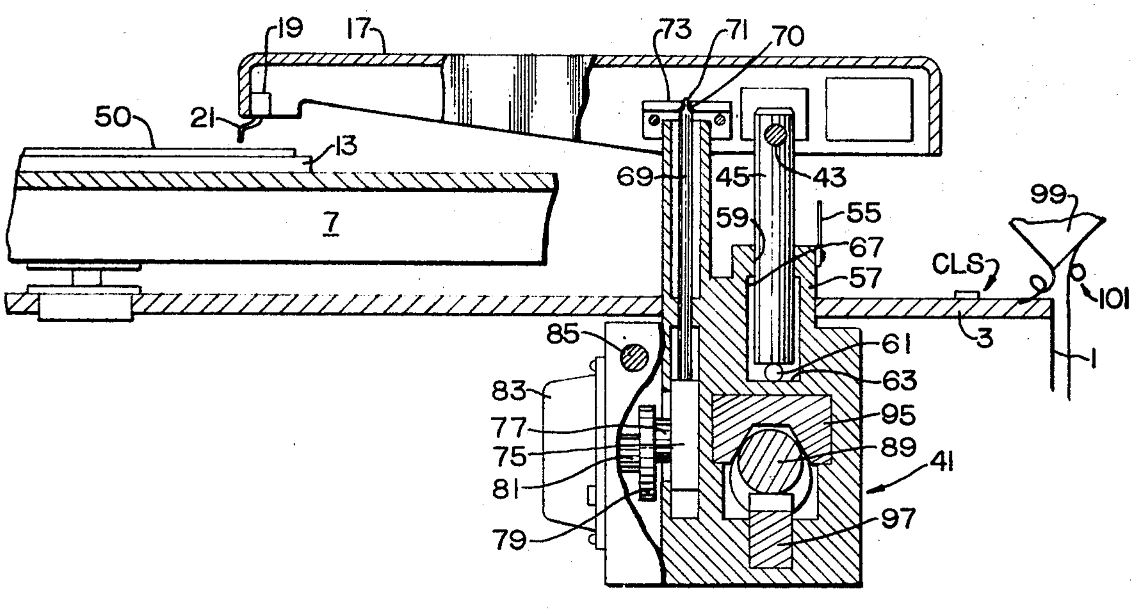
FIG. 3 is an illustration in cross sectional view taken along the lines 3—3 of FIG. 1.

FIG. 3 illustrates in detail the construction of the arm 17. The arm 17 is mounted for translation in a direction parallel to a radius of the turntable 7 by a drive assembly generally designated 41. Referring to FIGS. 1 and 3, the arm is journalled for rotation to move the stylus 21 into and out of engagement with the memory disk 50 on the turntable 7, by means of a jewel bearing comprising a shaft 43 fixed transversely in an upstanding shaft 45 and engaging a pair of jewels 47 and 49 affixed to the side walls of the arm 17. As best shown in FIG. 3, the upward pivotal movement of the arm 17 is limited by a stop plate 55 secured to an upstanding part 57 of the drive assembly 41. The shaft 45 is supported in a guide bearing 59 formed by a bore in the drive assembly 41, and is supported against downward movement and journalled for rotation by a thrust bearing comprising a ball bearing 61 resting at the base 63 of an enlarged bore 67 formed in the drive housing 41.

In the position of the arm 17 shown, it is held at a fixed distance above the record 50 by a pin 69 at the upper end of which is a conical portion 70 terminating in a reduced pin 71. In the position shown, the conical portion 70 between the pin portions 69 and 71 fully engages a slot 72 in a bracket 73 secured to the sides of the arm 17.

A Scotch yoke 75 driven by a crank pin 77 formed on a crank arm 79 controls the position of pin 69. When the pin 77 is in the position shown in FIG. 3 the pin 69 is in its upper position. This pin 69 is moved downwardly so that the pin 71 is clear of the bracket 73 when the crank 77 moves down to its lower position. The crank arm 79 is driven by a crank shaft 81 comprising the output drive shaft of an arm control motor 83.

In the lower position of the crankpin 77, the pin 71 fits loosely in the slot 72 in the bracket 73, and the arm 17 is free to follow the stylus 21 as it tracks the groove on the memory disk 50, for several turns ahead of and beyond the portion of the groove that should carry the desired address, before the pin 71 again engages slot 72 in the bracket 73.

In practice, the lost motion thus permitted is made sufficient so that the pin 71 never engages the side of slot 72 in normal operation. The arm drive housing 41 is supported for sliding movement by a guide rod 85 journalled in flanges such as 87 depending from and formed integral with the turntable support plate 3. The drive housing 41 is further supported and controlled in position by the worm screw 89 journalled in a suitable bearing attached to the base 1 at the right side in FIG. 1 but not there shown, and is connected at the other end to the drive shaft 91 of an arm position control motor 93 secured to the flange 87.

The top of the screw 89 engages a smooth guide block 95, as shown in FIG. 3. The bottom of the screw 89 engages a drive tooth 97 that is secured to the housing 41. It will be apparent that by that arrangement, as the screw 89 is rotated in one direction or the other, the arm 17 will be translated in a direction parallel to a radius of the disk 50 so that it will successively traverse turns of the groove recorded on the memory disk 50.

One of the major problems associated with economic construction of a memory system such as that illustrated is that of tolerances. In order to precisely locate the stylus 21 in the appropriate portion of the groove, without using information supplied from the disk itself, all of the tolerances of the positioning of the arm with respect to the case and the spindle and the turntable, as well as the disk, groove and positioning of the memory disk on the turntable would have to be held to extremely rigid standards. It is a feature of this invention that this type of extreme tolerance control is unnecessary since the memory disk itself carries the address information and the operation of the memory system involves a calibration step which positions the arm 17 precisely with respect to a known address on the disk.

In the present embodiment this calibration step performs the function of moving the arm 17 from a stop position beyond the limits of turntable 7 to a home position above a specific portion of the spiral groove which is at the center of the band and carries a specific address. Once this has been accomplished, the address of any keyboarded entry is compared to this known "home address" and the difference in locations serves us a computational basis for directing the arm 17 to a position three turns outside the keyboarded entry address. These three turns provide for a margin against positional error so that the stylus 21 always engages the groove at a position farther out than the known address and the rotation of the disk then carries the arm toward the center of the disk and toward the sought address.

Before commencing operation and after a memory disk has been placed on the turntable, the calibration button 29 is pushed and initiates a calibration cycle. In the calibration cycle, address locator 33 is provided with a binary address corresponding to the address of that portion of the groove midway between the inner and outer limits of the grooved portion 52 of the disk 50. The arm 17, at this juncture, is positioned at a stop position entirely beyond the limits of the turntable and memory disk. The stepping motor 93 is actuated causing arm 17 to be moved to a position which is in the vicinity of the desired home address location. When it reaches this position motor 83 controlling the pin 69 is actuated to lower the arm 17 into engagement so that the stylus 21 engages the groove 52. Once engaged, the stylus provides the address information stored in the groove to the address locator 33, which compares the actual address where the stylus is located to the desired address corresponding to the home position. This difference is then applied to the stepping motor 93 and the arm 17 is raised out of engagement with the groove and stepped to a position corresponding to the actual home position. At this point the initial calibration has been completed and the arm is now in a home position which is specifically registered with respect to this specific memory disk in place on the turntable.

When it is desired to look up a 10 digit number, the push buttons 23 are actuated to enter the number and the address of this number is now compared to the address of the home position of the arm 17. The stepping motor 93 is then stepped in the appropriate direction so that the arm 17 moves to position stylus 21 directly above that portion of the groove which is three turns on the outer side of the address of the entered number. The arm stays in this position until a magnet 37 carried by the turntable is aligned with a magnetic detector 39 in the base, indicating a specific rotational position of the turntable. When this has occurred, the motor 83 is energized to lower the arm 17 placing the stylus 21 in the groove 52. The first complete address within the groove is read from the disk into the address locator 33 and stored to indicate the position of the arm 17. As the memory disk continues to rotate the groove carries the stylus 21 inwardly toward the center of the disk and the addresses are continually read out and compared to the address which has been entered in the data entry process.

When the comparison indicates that the proper address has been reached the comparator unit 34 is actuated and the entire binary signal representing the ten digit number is now compared to the binary signals from the memory disk. If the comparator 34 is presented with an exact matching of binary signals for the entire 10 digit number from both the keyboard entry and from the memory disk, then it provides an output signal to the output indicator 35 which lights the light on the unit indicating that the number is indeed listed. If, on the other hand, a decimal number at this address, larger than the decimal number entered on the keyboard is received at the comparator 34, then it provides an output indicating signal showing that this number is not listed. The latter is an appropriate operation since the numbers at every address are listed in sequence of ascending value and hence the reading of a number greater than that keyboarded in the data entry indicates that the number is not stored on the memory disc.

Once a number has been indicated as either listed or not listed, the pin 69 is driven by motor 83 to raise the arm 17 disengaging the stylus 21. The conical end 70 of the pin 69 provides, in the raised position, a tight fit between the pin and the arm bracket 73, and in the lowered or engaged position, the arm is free to move with respect to the pin 69. With this arrangement, the arm, when raised, always returns to the position that it occupied when it was first lowered into engagement with groove 52. Since this position was first read from the memory disc into the address locator, then the address locator now contains a binary signal representing the precise location of the arm 17 with respect to the memory disc 50. At the conclusion of the listing operation, the address locator compares this known position of the arm 17 with the desired central home position and actuates stepping motor 93 to drive the arm to this home position. Thus, at the conclusion of every operating cycle, the arm 17 is precisely positioned with respect to the center of the groove 52 on the memory disc.

While in the embodiment described, the address has been contained in the groove as a portion of the signal being stored, other means are also available. One such means is to employ a stereo record in which two channels are contained in each groove. A suitable addressing scheme may then be recorded in one channel, while the ordered information is stored in the other channel.

As earlier mentioned, the system of this invention applies to a rotating medium which is most usually a disk as illustrated in FIGS. 1 and 2. The invention also applies, however, to a cylinder in which the groove is in the outer surface of the cylinder spiraling axially along it, so that the address locations would indicate portions of the groove distributed along the axis of the cylinder. In the instance of a cylinder, the physical configuration of the system would, of course, differ from that shown in FIG. 1. The principles of operation, however, will remain the same.

In the embodiment described above in connection with FIG. 1, the calibration system was based on carefully positioning the arm at a position above the center portion of the groove with this position defined by referring to the address contained on the disk. At the completion of each operation in which a particular address within the memory disk was accessed, the arm was returned again to this reference position. An alternative calibration scheme involves the arm returning after each accessing operation to a stop beyond the limits of the memory disk and obtaining a disk reference position with the aid of specific calibration grooves on the memory disk itself.

Figure 6:
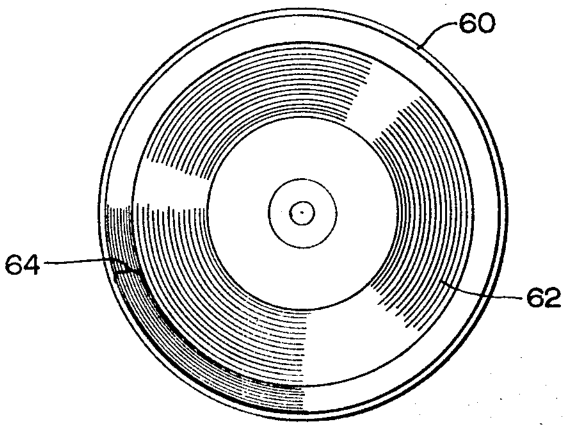
FIG. 6 is an illustration in plan view of a storage disk suitable for use in an embodiment of another embodiment of a memory system constructed in accordance with the principles of this invention.

Such a disk is illustrated in FIG. 6. At the outer periphery of the memory information groove 62, disk 60 has inscribed a groove or set of grooves 64. The groove 62 is of the same type as the groove in the memory disk shown in FIG. 2, that is a continuous spiral containing the information in the same ordered form at local addresses. For calibration purposes the outer set of grooves or outer portion of a spiral groove 64 has inscribed therein only information identifying its particular radial position. For example, if the outer twenty turns of a spiral groove were employed as a calibration section, then each turn of the groove would carry a distinct code identifying its radial position. Using this arrangement, upon entry of a keyboarded number, the arm 17 would travel from the stop to a position over the twenty outer grooves. The tolerances required to move from a stop off the turntable to a position within $\pm$ 10 turns of the memory disk are not particularly stringent. Once above the area of these calibration grooves, the arm 17 is lowered until the stylus 21 engages the groove. The position identifying code on this calibration groove is then read into the address locator unit 33 and this location is compared with the known address of the keyboard data entry. The arm 17 is then raised, disengaging the stylus 21 from the groove and the stepping motor 93 is actuated to traverse the arm to a position three turns before the sought after address, the number of steps being determined by the difference between the calibration groove address and the keyboard entry address. In effect, such an arrangement provides for a calibration for the variations in disk sizes and for the variations in spacing between the stop and the spindle and this calibration is repeated for each operation of looking up information in the memory disk.

In the embodiment described above and illustrated in FIGS. 1 through 6, the turntable speed is operated at a conventional rotational speed, such as 45 r.p.m. with a record having a groove with a pitch of about 170 turns per inch. A radial entrance margin of three turns is used to insure that the stylus is engaged at a point in the groove farther out than the address being sought. With these conditions an average time of 5 seconds is required to determine whether a 10 digit decimal number is listed or not.

In an alternative embodiment, the arm 17 need not be calibrated in the same fashion as has been described above. In this alternative embodiment, the arm is positioned at a home position controlled by a stop away from the limits of the turntable itself, and is moved directly from this stop to an engaged position on the memory disk. When a keyboard number is entered, its address is compared to the home stop position and the arm is moved to a position intended to be a relatively large number, for example, 12 turns outside of the keyboard entry address and the stylus is engaged in the groove at this point. It will be understood that, without rigid spacing tolerances in the mechanism, the actual position may be several turns removed from the intended position. When the stylus engages the groove, the first address code it senses is compared to the sought address thereby determining the difference between the actual position and the address being sought. In this embodiment the turntable is provided with a two speed motor and a clutching arrangement to control the speeds of the motor. One speed is the normal reading speed, for example, 45 r.p.m. and the other speed is a speed which may be several times as fast, for example, 135 r.p.m. When the difference between the actual address and the sought address is sensed, the clutch is actuated to speed up the turntable and this increased speed is maintained for the number of rotations required to advance the stylus from its initial position to a position two or three turns outside of the sought after address. The number of rotations may be measured by counting the number of pulses generated by the magnetic switch 39. Using this technique a random access time of approximately 5 seconds can be achieved with equivalent mechanical tolerances to those required for the systems illustrated in FIGS. 1 through 6.

Figure 7:
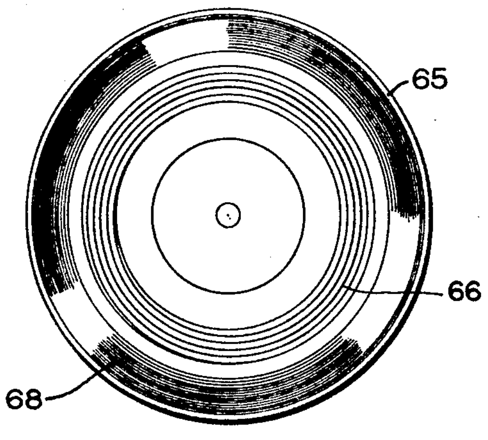
FIG. 7 is an illustration in plan view of still another data disk for use in a third embodiment of a memory system constructed in accordance with the principles of this invention.

In FIG. 7 there is illustrated a memory disk 65 which includes the memory information stored in a continuous spiral groove 68 extending in the same fashion as the earlier embodiments over the outer portion of the memory disk. The center section of the memory disk, which is normally not used for storage of information, contains a second spiral groove of much coarser pitch than the outer groove 68. The groove 66 may, for example, have a pitch 25 times lower than that of the information carrying groove 68. The groove 66 is inscribed with undulations representing a series of digital signals, the digital signals representing a series of binary codes, each indicative of the radial position of the coarse groove 66 in which it is located. The coarse groove 66 might, for example, carry 25 such identifying codes representing 25 radial positions. In one embodiment the digital information to be stored in the memory disk is inscribed on the information carrying groove 68 in the same fashion as for the earlier embodiments, except that the address location need not be carried in the information groove itself, nor need it be inherent in the coded information. In some instances, however, it may be preferred to include the address code in the information groove 68.

Figure 8:
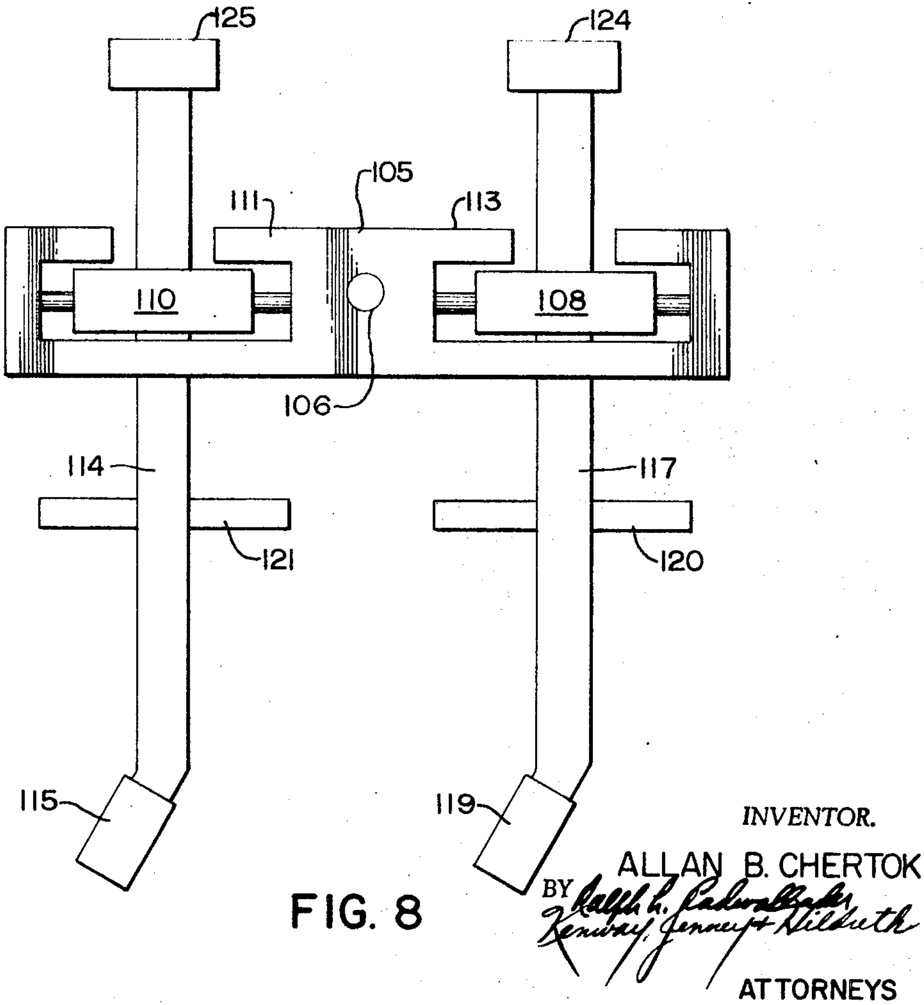
FIG. 8 is an illustration of an arm mechanism for use in conjunction with the disk of FIG. 7.

The memory disks of FIG. 7 are intended to be utilized in a memory system, which includes a data entry system and turntable, as illustrated in FIG. 1, but wherein arm 17 is replaced by an arm mechanism as illustrated in FIG. 8. The arm mechanism of FIG. 8 contains two arms, 114 and 117. Arm 117 contains a stylus head 119 at one end and a counterweight 124 at the other end. Similarly, arm 114 carries a stylus head 115 at one end and a counterweight 125 at its other end. The two arms 114 and 117 are mounted in a bracket 105 with arm 114 pivoted in a pivot block 110 for vertical motion with respect to the bracket, while arm 117 is mounted on pivot block 108 for vertical motion with respect to the bracket 105. This arm arrangement provides for very precise lateral positioning between the heads 115 and 119 while allowing each arm to be independently raised and lowered. The bracket 105 is pivoted in a horizontal plane at 106 thereby allowing lateral rotation of the entire assembly. The spacing between the styli 115 and 119 is arranged to precisely correspond to the spacing between groove 66 and groove 68, so that when stylus 115 is engaged at a specific point on groove 66, this corresponds to stylus 119 being positioned above a known location on groove 68. The memory information is stored in the groove 68 at positions which are identified by addresses encoded in groove 66.

Figure 7A:
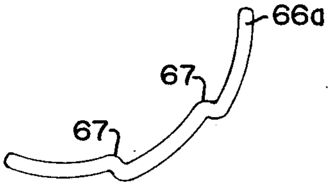
FIG. 7*a* is an illustration of an alternative form for storing the address information in the coarse groove of FIG. 7.

In a listing operation or other type of memory search in which the address of information entry is provided, the address locator arm 115 is engaged at one end of the groove 66, typically the outer end, and the turntable is rotated carrying the arm 114 quite rapidly, because of the coarse pitch, inwardly along the groove 66. As the stylus 119 proceeds, the coded addresses are read into an address locator unit and, when the address read from the coarse track 66 corresponds to the sought address, the arm 114 is immediately raised out of engagement with the groove 66 and arm 117 which has moved laterally in tandem with arm 114 is lowered so that stylus 119 engages groove 68. In this system then the coarse groove 66 serves the function of carrying the arm assembly including the information pickup arm 117 to an appropriate position and the information within the coarse groove 66 is used by stylus 115 to indicate when the correct position is reached. While it is clear that the coarse center groove 66 has a total length which is relatively short compared to the information carrying groove 68, it will be apparent that the data density of information stored in the center coarse groove 66 need not be particularly high, since it would usually contain a series of addresses and each address may have several thousand bits of information stored at the corresponding position in the information groove 68. An alternative form for storing the address information in the coarse groove is illustrated in FIG. 7a. In this arrangement the coarse groove is designated 66a and is formed not as a spiral, but as a series of interconnected concentric segments, each segment being of smaller radius than the next. The stylus will then record a pulse at each discontinuity and remain at a fixed radial position until the next discontinuity. The address locator circuitry to be used with such a groove form, then determines the address incrementally, that is it totals the number of pulses or discontinuities from the beginning of the track and is, for example, included to go to the 11 discontinuity, which represents the 11th radial increment.

Figure 9:
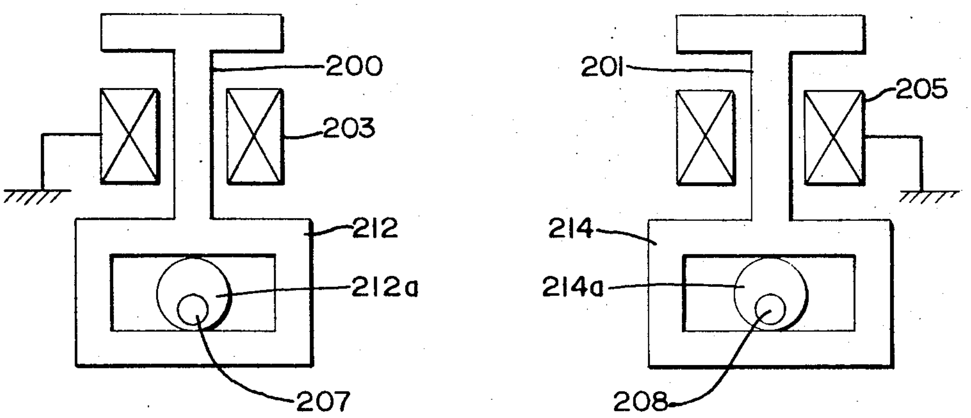
FIG. 9 is an illustration of an actuating assembly for use in conjunction with the arm mechanism of FIG. 8.

In FIG. 9 there is illustrated one form of actuating arrangement for raising and lowering the arms 114 and 117. A pair of pusher elements 200 and 201 are formed as extensions of scotch yokes 212 and 214 respectively. Arm 200 is supported on the base by bearing 203 and arm 201 is similarly supported by bearing 205. Yokes 212 and 214 are reciprocated by the eccentrically mounted cams 212a and 214a respectively. The cams are actuated by shafts 207 and 208 of individual motors (not shown). The entire assembly is positioned so that pusher 201 is vertically placed beneath crosspiece 121 on arm 114 and pusher 200 is positioned beneath crosspiece 120 on arm 117. Actuation of motor carrying shaft 208 then lowers pusher arm 201 allowing stylus 115 to engage groove 66. At this time pusher 200 is in its raised position ensuring that stylus 119 is disengaged from the groove. On the other hand, when the motor carrying shaft 207 is actuated pusher 200 lowers allowing stylus 119 to engage in groove 68, and the other motor is again energized ensuring that stylus 115 is raised out of engagement with groove 66. The length of the crosspieces 120 and 121 provide that the arms 114 and 117 may move radially inwardly and outwardly over the memory disk without becoming disengaged from their respective pushers.

While the system described in conjunction with the memory disk illustrated in FIG. 7, has assumed a constant turntable speed, it will be understood that a two speed turntable may also be employed with this arrangement. Under these circumstances the traversing of the arm assembly, when stylus 115 is engaged in coarse groove 66 may be speeded up to a speed of 2 or 3 times the turntable speed associated with the reading out of groove 68. Upon disengagement of the stylus 115, the turntable speed may be decreased before the lowering of arm 117 and engagement of stylus 119. The use of the variable speed turntable provides for a faster access time with a slightly higher pitched central groove, thereby increasing the length of the central groove, allowing for a lower spatial density of addressing information.

One key feature of the memory disk described in conjunction with this embodiment thus far has been that both the stored memory information and the addressing information are stored in the form of phonograph grooves. This feature permits the memory disk to be replicated in the same manner as conventional phonograph disk, that is by preparation of a master record and pressing any desired number of duplicates. Such a feature is very valuable where it is desired to distribute the same memory information to a wide number of stations. One application of this type of memory system is in storing, for example, discontinued credit card numbers at a wide number of stations where the credit cards may be used. Upon presentation of a credit card, the operator then keyboards in the credit card number and the memory system determines whether or not it is on the derogatory list, thereby approving or disapproving the card.

The memory disks need not, however, contain all of the information in the form of mechanical undulations in the groove. Thus, in FIG. 10 there is illustrated a memory disk 130 in which the information carrying portion of the disk is a magnetizable surface 131 and the disk contains a coarse pitch groove 132 at the center. As in the embodiment of FIG. 8, the coarse pitch groove 132 contains address information in the form of mechanical undulations, but in this embodiment a magnetizable surface 131 is used for storing the memory information. With this type of disk, the arm 117 of the arm assembly illustrated in FIG. 8, carries a magnetic pickup head rather than a stylus, while the arm 114 continues to carry the stylus. With this type of apparatus, the data is stored in the form of magnetic signals in concentric rings in the magnetizable area 131. Thus when the address has been located in the coarse groove 132, the stylus head 115 is raised out of engagement with the groove and the magnetically sensitive head 119 is lowered into close juxtaposition to the magnetic surface 131. Since the head 119 is not riding in any groove, it will stay in the same radial position and hence a concentric ring at this radial position is addressed. One convenient use for memory disks of this type is to replicate a series of disks with a known address, or locator file in the coarse groove 132 and thereafter by using head 119 as a read-write head and arranging the arm assembly so that both heads are not in the lower position simultaneously, selected information can be written into the magnetizable surface at specific addresses. To reach the information thus stored in the memory, only the address need be entered into the system.

Figure 10:
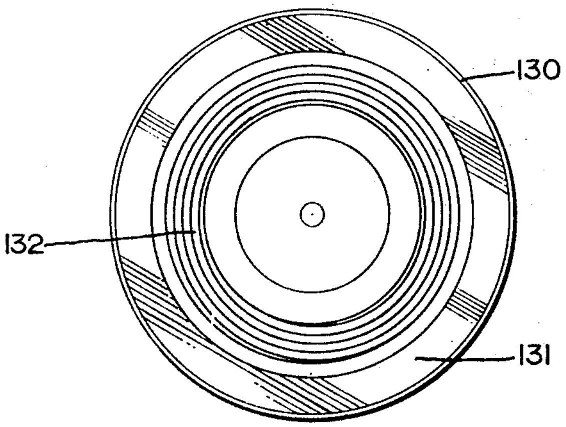
FIG. 10 is an illustration of a data disk for use in a memory system constructed in accordance with the principles of this invention.

While the center groove 132 in the embodiment of FIG. 10 and, the center groove 66 in the memory disk of FIG. 7 must necessarily be a physical groove in order to guide a stylus and control the position of the arm, the addressing information may be stored in them by other means than mechanical undulations in the groove. Thus the inner surface of the groove might have a magnetizable material along one side, or the surface of the disk between the groove turns might be magnetizable and the address information stored in magnetic form. In that case, the head 115 would have to include a guiding pin to fit in the groove and, additionally a magnetic pickup for sensing the address code. Another possibility is that the groove 132 or 66 might contain the address information coded in a form which can be read out by optical means such as the variation of reflectivity. In that instance the head 115 would have to include both the physical guide means and an optical transducer.

Figure 12:
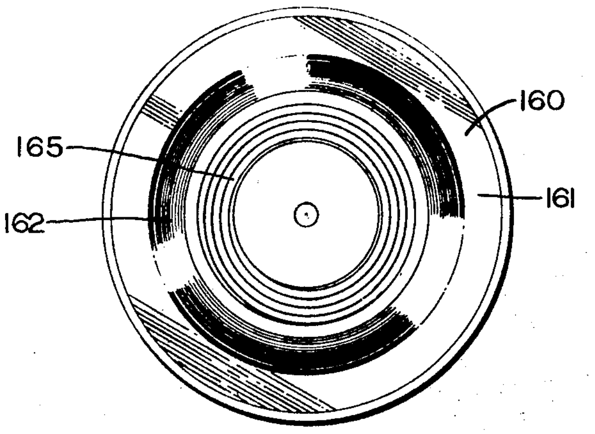
FIG. 12 is an illustration of a data disk for use in a memory system having an arm mechanism as illustrated in FIG. 11.

In FIG. 12 there is illustrated a memory disk which contains a coarse addressing groove 165, a higher pitch spiral groove 162 extending over a portion of the disk radially further out than the address groove 165 and a magnetizable surface 161 lying closer to the periphery of the disk 160. The center groove 165 contains address locator codes as in the disks of FIG. 7 and FIG. 10. The stored information is carried as magnetic signals on the magnetizable surface 161 and the fine pitch groove 162 acts as a guide for guiding the travel of the magnetic sensing head when reading out the information stored in the magnetic region. This arrangement permits the magnetic information to be stored in a spiral track which parallels and has the same pitch as the spiral guide groove 162. In this instance the disk would be replicated with groove 165 containing mechanical undulations carrying a series of address codes corresponding to different radial positions of this coarse groove and with a fine pitched groove 162 lying radially outside of the coarse address groove this latter groove containing no coded information. By using a read-write sensing head, this "self-addressed" memory disk can be used to store any coded information in magnetic form at a series of known addresses.

Figure 11:
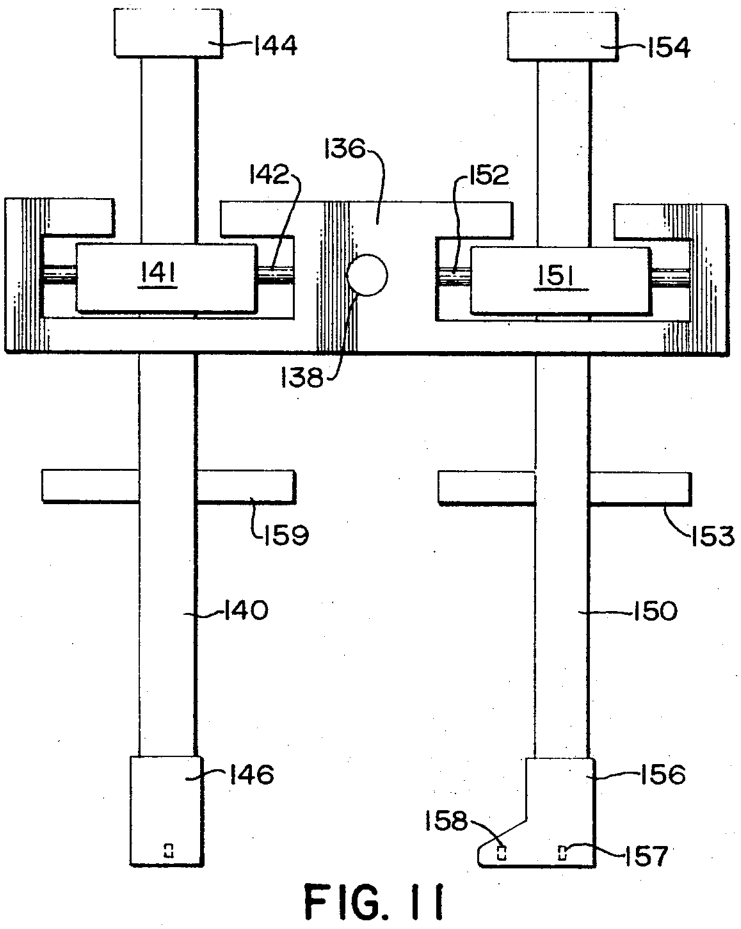
FIG. 11 is an illustration of another embodiment of an arm mechanism for a memory system constructed in accordance with the principles of this invention.

In FIG. 11 there is illustrated a pickup arm assembly suitable for use with the memory disk of FIG. 12. The arm assembly contains a pair of arms 140 and 150, with arm 140 having a phonograph stylus 146 at one end and a counterweight 144 at the other. Arm 140 is pivoted through pivot block 141 for vertical rotation with respect to a horizontally pivoted yoke arrangement 136. The second arm 150 has a counterweight 154 at one end and is pivoted on pivot block 151 for vertical movement with respect to the same yoke. The sensing head 156 of this second arm 150 contains a magnetic sensor 157 and a guide pin 158 separated by a fixed distance from the magnetic head 157. The yoke 136 maintains the two arms in horizontally fixed relation, while allowing separate vertical motion of the arms. The yoke itself is horizontally pivoted at pivot 138 allowing both arms to move radially across the surface of the memory disk. The spacing between the pin 158 and the magnetic sensing head 157 is made identical to the spacing between the inner turn of the groove 162 and the inner section of the magnetizable surface 161.

In operation, then, the stylus 146 engages the groove 165 and at a specific discrete address this arm is raised and arm 150 is lowered so that the pin 158 rides in groove 162 and the magnetic sensing head 157 is positioned over a particular portion of the magnetizable surface 161. Rotation of the turntable and of the memory disk 160 then causes pin 158 to spiral slowly inward, because of the fine pitch of groove 162, and carries magnetic sensing head 157 on a parallel path over the magnetizable surface. By this technique specific information can be magnetically written in at specific radial addresses and the readout function is operated in similar fashion with the magnetic sensing head in a read instead of a write electrical condition. Such an arrangement has all of the advantages of mechanical tracking of a phonograph stylus and yet has the ease of writing and erasing associated with a magnetic storage surface. Since the center groove 165 contains the addressing information, then the random access features are preserved.

While the embodiment illustrated in FIG. 1 includes as a data entry system a keyboard unit with push buttons 23, it will be understood that this is only one of many possible ways of entering information into the memory system. Thus, in the credit card application, automatic sensing means for detecting the number carried on the credit card may be substituted for the keyboard and the sensed number, converted into binary form, would be entered into the proper storage register of the address locator and of the comparator. Other techniques for entering numbers to be looked up or addresses in order to determine the information content carried therein include punch cards, punch tapes and magnetic tape inputs. While the description has only included reference to one particular signal format for carrying the digital data, other formats including but not limited to combinations of tones, square waves and carrier modulated systems may also be used. Also, the addressing code need not be a time function, but could, for example, be a combination of specific tones.

The invention having been described various modifications and improvements will now occur to those skilled in the art and the invention should be construed as limited only by the spirit and scope of the appended claims.

What is claimed is:

1. A random access memory system comprising,
a storage medium rotatable about a fixed axis,
means for rotating said storage medium about said axis,
a continuous generally spiral groove inscribed on a surface of said medium, the axis of said spiral being the axis of rotation of said medium,
a series of digital signals associated with said groove in an ordered sequence such that a specific sequence of signals is indicative of the location of a specific portion of the groove,
guide means for engaging said groove to move along said spiral upon rotation of said medium,
means for positioning said guide means within said groove,
sensing means associated with said guide means for sensing the digital signals associated with said groove and providing an output indication of the sequence of signals,
address entry means for entering an address code indicative of the portion of said groove to be accessed, and
decoder means responsive to the output signals from said sensing means and to the address code in said entry means to provide an output indication when said guide means is positioned in the addressed portion of said groove.

2. A memory system in accordance with claim 1 wherein said storage medium is in the form of a disk, said guide means is a phonograph stylus and said signals are stored within said groove in the form of mechanical undulations, said mechanical undulations interacting with said stylus to produce output signals from said stylus related to the sequence of signals stored within said groove.

3. A memory system in accordance with claim 1 wherein said storage medium is in the form of a disk.

4. A memory system in accordance with claim 3 wherein said guide means and said sensing means are carried on an arm, said positioning means including step translating means for traversing said arm in a series of predetermined steps along a path extending radially over said disk, said positioning means further including calibration means for initially positioning said guide means in a calibration position wherein said guide means is disengaged from the groove on said memory disk but located in fixed relation to a specific portion of said groove associated with specific identifying code, said data entry means acting upon the entry of a multiple digit decimal number, to actuate said positioning means to advance said arm from its calibration position to a position in fixed relation to that portion of said groove associated with the address code of said entered number by stepping said traversing mechanism a number of steps directly related to the difference between said calibration position address and the address of said entered number.

5. A memory system in accordance with claim 4 and further including comparator means for comparing the total multiple digit decimal number entered into said data entry means with each of the multiple bit numbers stored at that portion of said groove designated by the same address code as said multiple digit number, said comparator means being actuated only when said sensing means produces an address signal from said groove identical to the address signal from said data entry means.

6. A random access memory system comprising,
a memory disk rotatable about a fixed axis,
means for rotating said memory disk about said axis,
a first continuous generally spiral groove inscribed on a surface of said disk, concentric with said axis, said first spiral being inscribed with a first pitch,
a series of identifying signals associated with said groove in an ordered sequence such that specific signals are indicative of the location of specific portions of said first spiral groove,
a second spiral groove inscribed on the surface of said disk, said second spiral groove being concentric with said axis of rotation and lying radially outside of said first spiral groove, said second spiral groove having a higher pitch than said first spiral groove, said second spiral groove containing digital information in an ordered sequence,
first guide means for engaging said first groove to move along said spiral upon rotation of said disk, first guide means carrying
a first sensing means carried by said first guide means for sensing the identifying signals within said first spiral groove,
a second guide means having fixed positional relationship to said first guide means in a plane parallel to the plane of rotation of said disk, said second guide means being adapted to engage said second spiral groove and to move along said second spiral upon rotation of said medium, and
second sensing means associated with said second guide means for sensing the information stored within the said second spiral groove,
address entry means for entering an address code indicative of a radial portion of said second spiral groove to be accessed, and
decoder means responsive to the output signals from said first sensing means and to the address code in said entry means providing an output signal when said first sensing means has sensed an identical address to that entered into said address entry means, and
means upon the generation of said output signal for disengaging said first guide means from said first spiral groove and for engaging said second guide means in said second spiral groove.

7. A memory system in accordance with claim 6 where said first groove is formed as a series of interconnected segments of concentric circles having a radial step at each interconnection, and wherein said steps forming the identifying signals of said groove and wherein said first sensing means senses the presence of each step and, for each engagement of said first guide means accumulates the number of steps said guide means passes to indicate the radial position of said first guide means.

8. A memory system in accordance with claim 6 wherein said identifying signals are carried in said first spiral groove in the form of mechanical undulations representing a digital code and wherein said first guide means includes a phonograph stylus.

9. A system in accordance with claim 8 wherein the information is stored in said second spiral groove in the form of mechanical undulations representing digitally coded information and wherein said second guide means includes a phonograph stylus.

10. A random access memory system comprising a memory disk rotatable about a fixed axis,
means for rotating said memory disk about said axis,
a continuous generally spiral groove inscribed on a surface of said disk about the axis of rotation of said disk and extending over only a radial portion thereof,
a series of identifying signals associated with said groove indicative of the location of specific radial portions of the groove,
guide means for engaging said groove to move along said spiral upon rotation of said disk, said guide means including a sensing means for sensing the identifying signals associated with said groove,
means for positioning said guide means within said spiral groove,
a concentric band of magnetizable material carried on a surface of said disk radially outside of said first spiral groove, a series of digital signals being contained on said magnetizable surface in ordered sequence, means for sensing magnetic signals being mounted in association with said guide means such that it is in fixed spatial relationship to said guide means in a plane parallel to the plane of rotation of said disk;

address entry means for entering an address code indicative of a specific portion of said spiral groove;

decoder means responsive to the output signals from said first sensing means and to the address code entered into said entry means and providing an output signal when the output signals from said first sensing means and the address code in said entry means is identical, and means for disengaging said first guide means from said spiral groove when said output signal is produced, whereby said magnetic sensing means is moved to a specific radial position whenever a specific address code is entered into said entry means.

11. A random access memory sensing means in accordance with claim 10 wherein said identifying signals are carried in said first spiral groove as a series of mechanical undulations representing a digital code and wherein said guide means includes a phonograph stylus.

12. A random access memory system comprising, a memory disk rotatable about a fixed axis, means for rotating said memory disk about said axis, a first continuous generally spiral groove characterized by a first pitch inscribed on a surface of said disk, the axis of said spiral being the axis of rotation of said disk, said groove extending over only a first radial portion of said disk, a series of identifying signals associated with said first spiral groove in an ordered sequence such that specific identifying signals are indicative of the location of specific portions of the first spiral groove, a first guide means for engaging said groove to move along said spiral upon rotation of said disk, said guide means including a sensing means for sensing the identifying signals associated with said first groove, means for positioning said guide means within said first spiral groove, a second spiral groove characterized by a higher pitch than said first spiral groove and inscribed concentric with said first spiral groove but radially outside of said first spiral groove, a concentric band of magnetizable material carried on the surface of said disk radially outside of said second spiral groove, a series of digital signals being contained on said magnetizable surface in ordered sequence, second guide means for engaging said second spiral groove to move along said second spiral groove upon rotation of said disk, magnetic sensing means carried by said second guide means in a position such that when said second guide means is engaged in said second spiral groove said magnetic sensing means is in juxtaposition to said band of magnetizable material, address entry means for entering an address code indicative of a specific portion of said first spiral groove, decoder means responsive to the output signals from said first sensing means and the address code entered into said entry means and providing an output signal when the output signals from said first sensing means and the address code in said entry means is identical, and means for disengaging said first guide means from said first spiral groove when said output signal is produced and for engaging said second guide means in said second spiral grooves after said first guide means has been disengaged.

13. A random access memory system comprising, a storage medium rotatable about a fixed axis, said storage medium carrying information at predetermined locations within it, means for rotating said storage medium about said axis, a continuous generally spiral groove inscribed on a surface of said medium, the axis of said spiral being the axis of rotation of said medium, a series of address signals associated with said groove in an ordered sequence such that a specific sequence of signals is indicative of the location of a specific portion of the groove, guide means for engaging said groove to move along said spiral upon rotation of said medium, means for positioning said guide means within said groove, sensing means associated with said guide means for sensing the address signals associated with said groove, address entry means for entering an address code indicative of the portion of said groove to be accessed, said positioning means being responsive to said entered address to position said guide means in a position on said storage medium related to said entered address code, and decoder means responsive to the output signals from said sensing means and to the address code in said entry means to provide an output indication when said guide means is positioned in the addressed portion of said groove whereby the information stored at said entered address may be ascertained.

14. A memory system in accordance with claim 13 wherein after said guide means is positioned in the addressed position of said groove, said sensing means provides output signals indicative of the information carried at that portion of the medium indicated by said address code.

15. A memory system in accordance with claim 13 wherein said address signals are carried within said groove in the form of mechanical undulations representing a sequence of digital signals and wherein said guide means and said sensing means comprise a phonograph stylus.

16. A memory system in accordance with claim 13 wherein said address signals associated with the groove represent incremental signals located at specific positions along said spiral groove and wherein said decoder means accumulates the sensed incremental address signals.

17. A random access memory system in accordance with claim 13 wherein said positioning means responds to the entered address such that it positions said guide means in said spiral groove at a position further out in the spiral than the specific portion of the groove identified by the entered address signals.

18. A memory system in accordance with claim 13 wherein the information carried within said storage medium is in the form of a series of digital signals within said spiral groove.

19. A memory system in accordance with claim 18 wherein the series of address signals within the groove are contained within the series of digital signals representing the information carried by said storage medium.

20. A memory system in accordance with claim 18 wherein the information stored at the entered address is sensed by the same sensing means which senses the address signals.

21. A memory disk having a first continuous generally spiral groove inscribed on a surface thereof, said first spiral groove being formed with a first pitch;

a second spiral groove inscribed on the surface of said disk, said second spiral groove being disconnected from and concentric with said first spiral groove and lying radially outside said first spiral groove, said second spiral groove having a higher pitch than said first spiral groove, said second spiral groove being mechanically modulated as a function of digital signals arranged in an ordered sequence providing unique address identifications of successive portions of said first groove.

22. A memory disk having a first continuous generally spiral groove inscribed on a surface thereof, said first spiral groove being formed with a first pitch;

a second spiral groove inscribed on the surface of said disk, said second spiral groove being concentric with and disconnected from said first spiral groove and lying radially outside said first spiral groove, said second spiral groove having a higher pitch than said first spiral groove, wherein said first groove is formed as a series of interconnected segments of concentric circles having a radial step at each interconnection.

23. A memory disk having a first continuous generally spiral groove characterized by a first pitch inscribed on a surface thereof, said groove extending over only a first radial portion of said disk;

a second spiral groove characterized by a higher pitch than said first spiral groove disconnected from and inscribed concentric with said first spiral groove but radially outside of said first spiral groove;

a concentric band of magnetizable material carried on the surface of said disk radially outside of the outer periphery of said second spiral groove.

24. A digital storage medium for use with a random access memory means having a radially movable arm carrying a stylus wherein said arm is moved radially in response to a digital address code entered into said system, the amount of radial distance being computed as the difference between the entered digital address and the initial position of the arm, said storage medium comprising a continuous spiral groove, said groove being mechanically modulated as a function of high bit density digital signals, said groove having a plurality of successive grooved portions, each radial turn being designated by a unique address, the modulations in each portion including digital address signals signifying the radial position of that portion, and corresponding to the digital address entered into said system to position said arm at said radial position, and a plurality of groups of high bit density digital information signals recorded on said storage medium, each group having a unique address corresponding to the address of one of said groove portions, said digital information signals being stored in a radial position having a fixed relation to the radial position of the portion of said groove storing its address, said groove being formed to guide sensing means to reproduce said digital information signals, wherein said digital information signals are recorded as mechanical modulations in the same groove as the said digital address signals, and wherein said digital address and information signals are recorded as first and second sets of orthogonally related undulations.

25. A digital storage medium for use with a random access memory means having a radially movable arm carrying a sensing means, comprising a continuous spiral groove, said groove being mechanically modulated as a function of high bit density digital signals, said groove having a plurality of successive grooved portions, each portion being designated by a unique address, the modulations in each portion including digital address signals signifying the address of that portion, and a plurality of groups of high bit density digital information signals recorded on said storage medium, each group having a unique address corresponding to the address of one of said groove portions, said digital information signals being stored in a radial position having a fixed relation to the radial position of the portion of said groove storing its address, said groove being formed to guide sensing means to reproduce said digital information signals, and wherein sais storage medium is a disk, said disk carrying a concentric band of magnetizable material on a surface thereof radially outside said spiral groove, said digital information signals being recorded on said magnetizable surface in a track having a fixed spatial relationship to said spiral groove.

26. A digital storage medium for use with a random access memory means having a radially movable arm carrying a stylus wherein said arm is moved radially in response to a digital address code entered into said system, the amount of radial distance being computed as the difference between the entered digital address and the initial position of the arm, said storage medium comprising a continuous spiral groove, said groove being mechanically modulated as a function of high bit density digital signals, said groove having a plurality of successive grooved portions, each radial turn being designated by a unique address, the modulations in each portion including digital address signals signifying the radial position of that portion, and corresponding to the digital address entered into said system to position said arm at said radial position, and a plurality of groups of high bit density digital information signals recorded on said storage medium, each group having a unique address corresponding to the address of one of said groove portions, said digital information signals being stored in a radial position having a fixed relation to the radial position of the portion of said groove storing its address, said groove being formed to guide sensing means to reproduce said digital information signals.

27. A digital storage medium as recited in claim 26, wherein said information signals in each group are recorded in an ordered sequence.

28. A digital storage medium as recited in claim 26, wherein said storage medium is a phonograph record disk.

29. A digital storage medium as recited in claim 26, wherein said digital information signals are recorded as mechanical modulations in the same groove as the said digital address signals.

* * * * *